F. G. Cameron,
Windlass.
Nº 776.    Patented June 12, 1838.
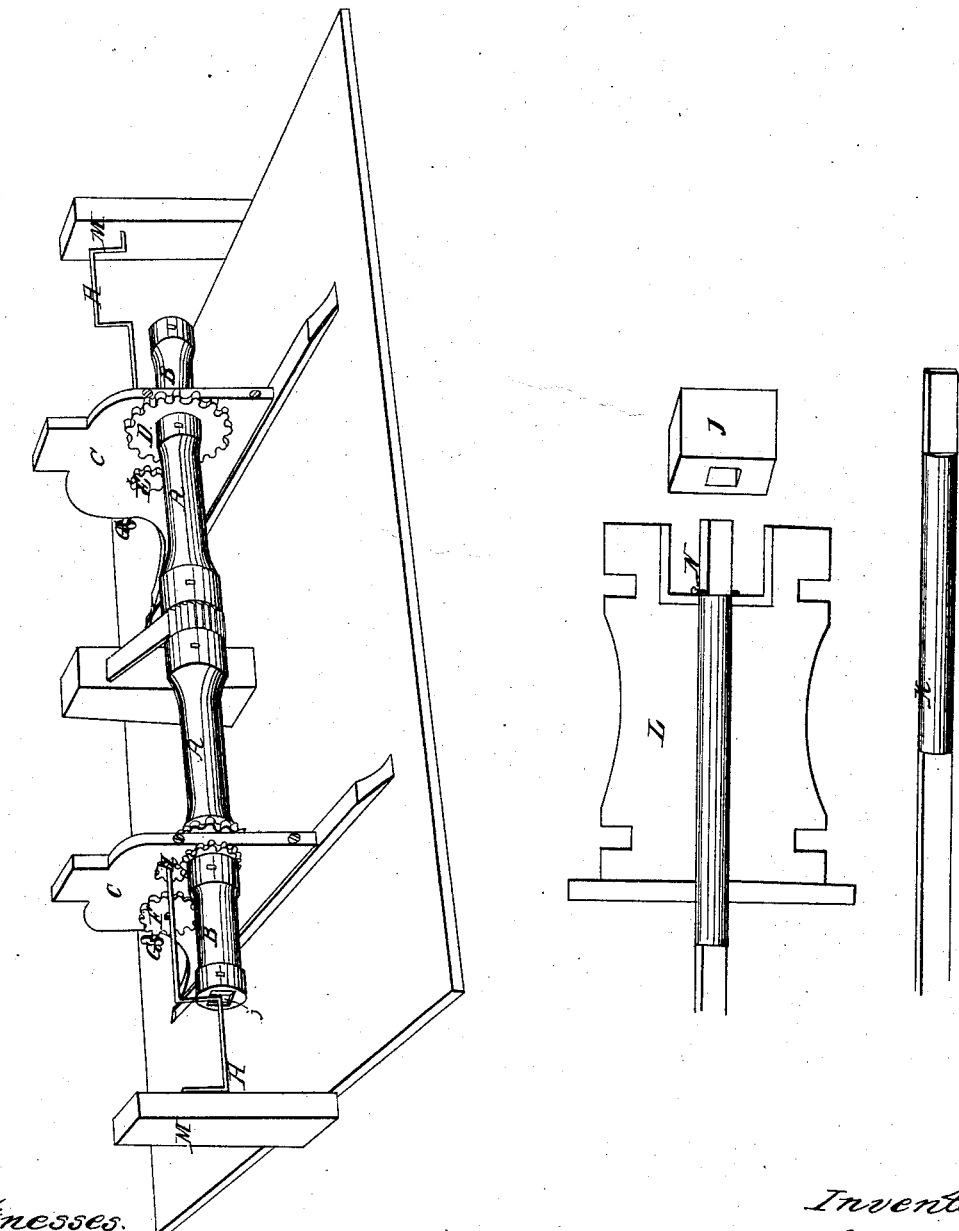
Witnesses.
Sarah Yeo
Daniel Cameron
Inventor.
F. Cameron

UNITED STATES PATENT OFFICE.

FREDERICK G. CAMERON, OF NEW YORK, N. Y.

WINDLASS.

Specification of Letters Patent No. 776, dated June 12, 1838.

*To all whom it may concern:*

Be it known that I, FREDERICK G. CAMERON, of the city, county, and State of New York, have invented a new and useful Improvement on Ships' Windlasses; and the following is a full and exact description thereof.

The nature of my improvement consists in giving the windlass more power by the application of certain wheels hereafter to be described, and that it can be used for more than one purpose at one time.

To enable others skilled in the art to make and use my invention, I will proceed to describe its construction and operation. I construct my windlass in the usual form, viz: a body, two ends, spindles, bitts, pole bitts, and pole. As my invention can be applied to either one, or both ends of a windlass, the following will be the description necessary for one end:

1st. The spindle K. The end that goes into the body A is square and fastened tight into it; the end that goes into the end B is round nearly all the way, and forms an axle for the end B to revolve on. The rest of this end of the spindle is left square for the box J to fit on.

2nd. On the body A is fitted a large wheel (similar to the wheel D). On the inner part of the end B is fitted a smaller wheel, (similar to the wheel E). The hole in the end B to be round and fairly bored so as to revolve easily on its part of the spindle K, except the part necessary for the box J to fit in, which is to be kept square.

3rd. Forward of the windlass, and running through the bitts C is an axle or spindle, which revolves freely. On the outer end of this spindle is attached a wheel (similar to the wheel F,) and on the inner end is attached a pinion (similar to the pinion F').

4th. To use this windlass, simply keep in the box J at the end B, which can then be used as a common windlass. To increase the power take out the box J, and gear in the wheel F and pinion F', into the wheels E and D by any known method, and heave on the end B, ungear the wheel F and pinion F'. The body A can be used for one purpose, while the end B can be used for another at the same time.

As this windlass can be used either with cranks or handspikes or both together, I shall describe the crank H, one end of which fits into the vessel's side M, the other into the bitts C, on which end is a pinion I, which gears into the wheel E.

N is a pin that goes through the spindle K after the end B is fitted on to keep it from flying off when in operation.

What I claim as my invention and desire to secure by Letters Patent, is—

That the part of the spindle K that goes through the end B is round and forms an axle for it to revolve on, that the end B revolves in a pendant of the body A, the application of the wheels E and F, which in combination with the pinion F' and wheel D gives an increased power to the body A by heaving out the end B.

In testimony thereof I have this 26th day of May, 1838, set my hand.

F. G. CAMERON. [L. S.]

Witnesses:
 A. C. AINSWORTH,
 GEO. B. WOODWORTH.